United States Patent [19]

Attarwala

[11] Patent Number: 5,424,343

[45] Date of Patent: Jun. 13, 1995

[54] THERMALLY RESISTANT CYANOACRYLATES EMPLOYING SUBSTITUTED NAPTHASULTONE ADDITIVE

[75] Inventor: Shabbir Attarwala, West Hartford, Conn.

[73] Assignee: Loctite Corporation, Hartford, Conn.

[21] Appl. No.: 960,480

[22] Filed: Oct. 8, 1992

[51] Int. Cl.6 ............................................. C08K 5/46
[52] U.S. Cl. ................................... 524/83; 523/176;
524/158; 524/159; 524/160; 524/171; 524/172;
524/555; 524/717; 524/742; 524/754; 526/204;
526/225; 526/298; 526/312; 558/304; 558/306;
558/307
[58] Field of Search ................ 524/83, 171, 172, 158,
524/159, 160, 742, 754, 555, 717; 526/298, 204,
225, 312; 523/176; 558/304, 306, 307

[56] References Cited

U.S. PATENT DOCUMENTS

| | | | |
|---|---|---|---|
| 2,665,299 | 1/1954 | Ardis | 260/465.8 |
| 3,355,482 | 11/1967 | Coover et al. | 260/464 |
| 3,357,185 | 1/1971 | Ito et al. | 260/465.4 |
| 3,640,972 | 2/1972 | Bolger et al. | 260/78.4 |
| 3,652,635 | 3/1972 | Kawamura et al. | 260/464 |
| 3,699,127 | 10/1972 | O'Sullivan et al. | 260/33.2 |
| 3,742,018 | 6/1973 | O'Sullivan | 260/465.4 |
| 3,832,334 | 8/1974 | O'Sullivan et al. | 260/78.5 |
| 3,836,377 | 9/1974 | Delahunty | 106/287 |
| 3,961,966 | 6/1976 | Brinkmann et al. | 106/36 |
| 4,038,345 | 7/1977 | O'Sullivan et al. | 260/881 |
| 4,139,693 | 2/1979 | Schoenberg | 526/297 |
| 4,170,585 | 10/1979 | Motegi et al. | 260/33.2 R |
| 4,182,823 | 1/1980 | Schoenberg | 526/298 |
| 4,196,271 | 4/1980 | Yamada et al. | 525/242 |
| 4,307,216 | 12/1981 | Shriaishi et al. | 526/298 |
| 4,321,180 | 3/1982 | Kimura et al. | 524/549 |
| 4,377,490 | 3/1983 | Shiraishi et al. | 252/188.3 R |
| 4,424,327 | 1/1984 | Reich et al. | 526/297 |
| 4,440,910 | 4/1984 | O'Connor | 525/295 |
| 4,444,933 | 4/1984 | Columbus et al. | 524/292 |
| 4,450,265 | 5/1984 | Harris | 526/248 |
| 4,490,515 | 12/1984 | Marriotti et al. | 526/298 |
| 4,532,293 | 7/1985 | Ikeda et al. | 524/754 |
| 4,560,723 | 12/1985 | Millet et al. | 524/486 |
| 4,565,883 | 1/1986 | Sieger et al. | 549/475 |
| 4,837,260 | 6/1989 | Sato et al. | 524/261 |

FOREIGN PATENT DOCUMENTS

| | | |
|---|---|---|
| 723603 | 5/1969 | Belgium . |
| 845247 | 6/1970 | Canada . |
| 48-8732 | 2/1923 | Japan . |
| 49-22432 | 2/1974 | Japan . |
| 49-22433 | 2/1974 | Japan . |
| 52-80336 | 7/1977 | Japan . |
| 55-36243 | 3/1980 | Japan . |
| 55-66980 | 5/1980 | Japan . |
| 3-177471 | 8/1991 | Japan . |
| 1196069 | 6/1970 | United Kingdom . |

OTHER PUBLICATIONS

Derwent WPI Abstracts of: DE 2,128,985; DE 2,107,188; SU 1,100,281; SU 1,208,058; JP 56/95,968; JP 55/104375; JP 61/108,684; DE 2,118,701; JP 49/316,169; JP 55/66,980; SU 1,395,649; NL 7,011,936; JP 49/94631; JP 50/89325; JP 1970/35271 B.

Chem. Abst. Abstracts of: JP 55/66,980; SU 514,010; JP 49/22,432; JP 52/78,933; JP 55/104,375; FR 2,487,842; JP 56/166,280; JP 57/109,876; WO 8,403,097; JP 60/199,084; JP 49/22,433; SU 1,395,649; JP 48/8732.

Huu-Dau, et al., *J. Chem. Research (S)*, 1985, 126–127.

*Primary Examiner*—Judy M. Reddick
*Attorney, Agent, or Firm*—Vidas, Arrett & Steinkraus

[57] ABSTRACT

A cyanoacrylate monomer adhesive formulation which has improved thermal properties resulting from the inclusion in the formulation of an effective amount for enhancing the thermal resistance of the cured polymer of a naphthosultone compound having at least one strong electron withdrawing group thereon, suitably a nitro group.

20 Claims, No Drawings

THERMALLY RESISTANT CYANOACRYLATES EMPLOYING SUBSTITUTED NAPTHASULTONE ADDITIVE

BACKGROUND OF THE INVENTION

Cyanoacrylate monomer adhesives are well known and widely used as "instant adhesives", so-called because of their very rapid polymerization on contact with surfaces containing even very weak anion sources. However, a notorious problem of cyanoacrylate polymers is their susceptibility to thermal degradation at only moderately high temperatures. As a consequence, the instant adhesive benefits of cyanoacrylate monomers have not been available in many applications where the bonded substrates may be subjected to intermittent temperatures in excess of 120° C. or extended exposure to temperatures of about 80° C. This problem of thermal stability of cyanoacrylate polymers is distinct from the problem of stabilizing monomer formulations against premature polymerization. However, to preserve the instant adhesive benefits of cyanoacrylates, it must be appreciated that improvements in polymer thermal stability should not significantly degrade the storage stability or cure speed of the monomer formulation from which the polymer is derived.

Numerous attempts have been made to improve the thermal stability of cyanoacrylate adhesive bonds. In U.S. Pat. No. 3,832,334, the addition of maleic anhydride is said to produce adhesives which have increased thermal resistance while preserving fast cure speed of the cyanoacrylate adhesive.

In U.S. Pat. No. 4,196,271, tri-, tetra- and higher carboxylic acids or there anhydrides are said to be useful form improving heat resistance of cured cyanoacrylate adhesives. Phthalic anhydride is reported to improve heat resistance of cyanoacrylate adhesive bonds in U.S. Pat. No. 4,450,265 and benzopheonetetracarboxylic acid or its anhydride are reported to provide a superior heat resistance for cyanoacrylate adhesives in U.S. Pat. No. 4,532,293.

According to Chem. Abst., 85:64138p a cyanoacrylate adhesive which includes a graft copolymer of methyl methacrylate and a fluorine containing rubber as a plasticizer is reported to give improved stability to thermal shocks. Cyanoacrylate adhesives containing elastomeric acrylic rubbers are reported to give improved properties, particularly after exposure to elevated temperatures, in U.S. Pat. No. 4,440,910.

In U.S. Pat. No. 4,490,515, cyanoacrylate compounds containing certain maleimide or nadimide compounds are reported to improve the hot strength properties of cyanoacrylate adhesives.

Mixtures of certain sulfone compounds and a dicarboxylic acid or dicarboxylic anhydride are said to greatly improve heat resistance of cyanoacrylate adhesives in JP 55/066980.

In Chem. Abst., 80 (22): 121806c (abstracting) JP 48/8732, cyanoacrylates containing 3-25% divinyl sulfone are reported to have improved heat resistance.

U.S. Pat. No. 4,560,723 describes certain cyanoacrylate adhesives containing a certain treated copolymer toughener, and a "sustainer" compound having certain compatibility properties said to provide improved retention of toughness on heat aging of the cured adhesive. Various substituted aryl compounds are identified as suitable "sustainers," including nitrobenzene, 1,2-dichlorobenzene, 1,2,4-trichlorobenzene and bromochlorobenzene.

Despite this extensive work in the art, there continues to be a need to identify materials which will improve the heat performance of cyanoacrylate adhesives so as to increase the options available to the formulator and/or provide further improvements over the existing additives known to enhance thermal resistance of cyanoacrylate polymers.

Various sultone compounds, including propane sultone, bromo phenol blue, 1,8-naphthosultone, butane sultone and 3,3',5,5'-tetramethylbutane sultone have been disclosed to be useful as shelf-life stabilizers and, at levels greater than 2%, as bond plasticizers for cyanoacrylate adhesives in U.S. Pat. 3,742,018, GB 1,196,069 and BE 353,262. It has subsequently become known, however, that the stabilizing activity of such sultones is inconsistent, the system requiring a minimal level of water contamination in the cyanoacrylate monomer in order to achieve effective shelf-life stabilization. The stabilization activity of sultone compounds has thus been traced to the sulfonic acid hydrolysis product rather to the sultone itself and commercial use of sultones as cyanoacrylate shelf-life stabilizers has been relegated to the status of a chemical intermediate. Only readily hydrolyzed sultones are utilized and hydrolysis of the sultone is undertaken prior to addition to the monomer so as to obtain consistent results regardless of water contamination level. No commercial use of sultones as bond plasticizers is known to have developed.

SUMMARY OF THE INVENTION

The invention herein is based upon the discovery that cyanoacrylate monomer adhesive formulations may be provided with improved cured thermal resistance properties by including in the formulation an effective amount for enhancing the thermal resistance of the cured polymer of a naphthosultone compound having at least one strong electron withdrawing substituent thereon.

Accordingly, the invention comprises a cyanoacrylate adhesive formulation or a cyanoacrylate polymer which includes an effective amount for enhancing the thermal resistance properties of the cured polymer, suitably between 0.1 and 10%, of a naphthosultone compound having at least one strong electron withdrawing substituent thereon, suitably one or more nitro groups.

DETAILED DESCRIPTION OF THE INVENTION

The α-cyanoacrylate adhesive compositions of this invention contain as their principal ingredient one or more α-cyanoacrylate monomers of the formula:

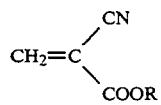

where R represents a $C_{1-16}$ alkyl, cycloalkyl, alkenyl, alkynyl, cycloalkenyl, alkaryl, aralkyl or aryl group, any of which may be optionally substituted or, interrupted with non-basic groups, such as oxo, halo and ether oxygen, which do not interfere with the stability and functioning of the monomer as an adhesive. Specific examples of the groups for R are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chlorobutyl group, a trifluoroethyl group, a 2-methoxyethyl group, a 3-methoxybutyl group and a 2-ethoxyethyl group. Ethyl cyanoacrylate is the preferred monomer for use in the inventive compositions.

A single α-cyanoacrylate monomer or a mixture of two or more of these α-cyanoacrylate monomers can be used. For a number of applications, the above α-cyanoacrylate monomer alone is not sufficient as an adhesive, and at least some of the components set forth below are typically added.

(1) An anionic polymerization inhibitor;
(2) A radical polymerization inhibitor;
(3) A thickener;
(4) Special additives such as cure accelerators, plasticizers tougheners and heat stabilizers;
(5) Perfumes, dyes, pigments, etc.

A suitable amount of the α-cyanoacrylate monomer present in the adhesive composition is about 75 to 99 by weight, based on the total weight of the adhesive composition.

An anionic polymerization inhibitor is added to the α-cyanoacrylate adhesive composition, e.g., in an amount of about 1 to 1000 ppm based on the total weight of the adhesive composition, to increase the stability of the adhesive composition during storage, and examples of known inhibitors are sulfur dioxide, sulfur trioxide, nitric oxide, hydrogen fluoride, and certain sultones, as discussed above. Particularly preferred for purposes of this invention are combinations of methane sulfonic acid (MSA) or hydroxypropane sulfonic acid (HPSA) with sulfur dioxide. Preferred concentrations of sulfonic acids range from about 5 to about 100, more preferably about 10 to 50, parts per million (based on monomer weight). The preferred concentrations of $SO_2$ range from about 15 to about 50 ppm for either acid.

While not essential, the cyanoacrylate adhesive compositions of this invention generally also contain an inhibitor of the free radical polymerization. The most desirable of these inhibitors are of the phenolic type, such as quinone, hydroquinone, t-butyl catechol, p-methoxyl-phenol, etc.

The above inhibitors may be used within wide ranges, but the following general guidelines are representative of the adhesive composition: acid gases, from about 0.001% to about 0.06% by weight; hydrolyzed or hydrolyzable sultones, from about 0.1% to about 10% by weight; sulfonic acids, from about 0.0005% to about 0.1% by weight; and free radical inhibitors, from about 0.001% to about 1% by weight of the composition.

A thickener frequently is added to increase the viscosity of the α-cyanoacrylate adhesive composition. The α-cyanoacrylate monomer generally has a low viscosity of about several centipoises, and therefore, the adhesive penetrates into porous materials such as wood and leather or adherends having a rough surface. Thus, good adhesion strengths are difficult to obtain. Various polymers can be used as thickeners and examples include poly(methyl) methacrylate, methacrylate-type copolymers, acrylic rubbers, cellulose derivatives, polyvinyl acetate and poly(α-cyanoacrylate). A suitable amount of thickener is generally about 20% by weight or less based on the total weight of the adhesive composition, preferably 3%–10% based on the total weight of the adhesive composition.

A number of conventional polymer additives may also be added for toughening purposes. Examples include acrylic elastomers, acrylonitrile copolymer elastomers and fluoro elastomers. In approproate amounts such materials may serve as both thickener and toughener.

Certain fumed silica fillers may also be usefully employed as cyanoacrylate thickeners. Various hydrophobic silicas are reported in the art to give satisfactory storage stable gels with cyanoacrylates. See, for instance U.S. Pat. Nos. 4,477,607, 4,533,422, 4,686,247, 4,837,260 and GB 2,204,872, all incorporated herein by reference. Preferred silicas are polydimethylsiloxane, octyltrimethoxysilane or hexamethyldisilazane treated silicas such as Cab-O-Sil® TS-720 (Cabot Corp.), Aerosil® R202 (Degussa Co.), Aerosil® R805 (Degussa Co.) or Cab-O-Sil® TS-530 (Cabot Corp.). Mixtures of such silicas may also be employed. Suitable levels of such silicas are in the range of 3%–12% based on total composition weight, preferably 4%–8%.

As examples of cure accelerators there are known, for instance, calixarene compounds as described in U.S. Pat. No. 4,556,700 and U.S. Pat. No. 4,695,61 5 and silacrown compounds as described in U.S. Pat. No. 4,906,317. Other accelerators are well known to those skilled in the art.

The naphthosultone additives utilized in the invention have at least one strong electron group substituent. As examples of strong electron withdrawing groups there may be mentioned, for instance, nitro, trifluoromethyl, cyano, sulfonyl, halo and carboxylalkoxy groups. Particularily preferred are nitro substituted naphthosultone compounds, especially nitronaphthosultone additives utilized include specifically nitronaphthosultone 6-nitronaphth-[1,8,-cd]-1,2-oxathiole S,S-dioxide) and diniteonaphthosultone (6,8-dinitronaphth-[1,8, cd]-1,2-oxathiole S,S-dioxide). These compounds are usefully employed at levels in the range of 0.1%–10% by weight of the formulation, preferably at least 0.25% and no more than the ambient temperature solution saturation level of the additive in the particular cyanoacrylate composition. Saturation for nitronaphthosultone compounds in typical ethyl cyanoacrylate adhesive formulations is about 2%. Most preferably the nitronaphthosultone compound is employed at a level of 1%–2% by weight of the formulation. The nitronaphthosultone compounds do not substantially affect the shelf life of the cyanoacrylate adhesive formulations in which they are employed.

The cyanoacrylate polymers produced from the adhesive formulations of the invention have higher thermal decomposition temperatures than compositions employing no additive. By way of contrast, formulations of the invention can be readily formulated to provide cured polymers having an onset of decomposition temperature, when heated at 10° C. per minute, of more than 200° C. whereas additive free polymers provide a decomposition onset temperature of only 155° C. Additionally, typical polymers of the invention are characterized by a weight loss of 10% or less (5% or less with some embodiments of the invention) when heated at 150° C. for 900 minutes, as opposed to greater than 95% weight loss under identical conditions for an additive free composition.

It has been observed that use of naphthosultone as a cyanoacrylate additive can also give some improvement of thermal properties in the cured polymer, but the improvement is less substantial even at much higher concentrations. Example 2 illustrates the comparative performance of nitronaphthosultone additives and naphthosultone.

Other additives which may be added to the cyanoacrylate adhesive compositions of the invention are plasticizers. Plasticizers serve to make the cured bonds less brittle and, therefore, more durable. The most common of these plasticizers are $C_1$ to $C_{10}$ alkyl esters of dibasic acids such as sebasic acid and malonic acid. Other plasticizers, such as diaryl ethers and polyurethanes, also may be used, and a variety of other plasticizers are also known.

The plasticizers, as well as cyanoacrylate compatible perfumes, dyes, pigments, etc., may be added depending on desired uses in amounts which do not adversely affect the stability of the α-cyanoacrylate monomer. The use of such additives is within the skill of those practicing in the cyanoacrylate adhesive art and need not be detailed herein.

EXAMPLE 1

The effects of nitronaphthosultone compound additives on the thermal properties of cured cyanoacrylate polymers were investigated in several ways. Thermal analyses of cyanoacrylate polymers to which had been added amounts of additive as shown in Table I were conducted dynamically to determine temperature at which decomposition onset occurred and isothermally at 150° C. to determine relative weight loss of polymer on heat aging. Fixture speeds and 82° C. stability were performed on monomer formulations containing the additives to ascertain whether the additive affected the cure speed or storage stability of the formulation.

Thermal analysis was done using two different instruments. the DuPont 2100 Thermal System with 951 Thermogravimetric Analyzer attached, and Seiko SSC5245HM2 controller attached to TG/DTA220 Thermogravimetric Differential Thermal Analyzer. Isothermal thermal runs were started from 30° C. and heated at 50° C./minute up to 150° C. and held at that temperature for 900 minutes under 250 cc/min nitrogen gas flow. Temperature dynamic runs were started at 30° C. and heated at 10° C./min up to 450° C. under 250 cc/min nitrogen gas flow.

Samples for dynamic analyses were all prepared by intimate mixing with a mortar and pestle of a prepolymerized cyanoacrylate polymer and the additive followed by heating of the mixture at 100° C. for two hours. Samples for isothermal analyses were either prepared in the same way or from a film prepared by placing a droplet of a monomer formulation containing the additive between pressed Santoprene ™ blocks for 72 hours at room temperature, followed by post-curing at 100° C. to completely polymerize all residual monomer present, and then separating the resulting polymer film. Both methods of sample preparation were found to give equivalent results.

Freshly distilled ethyl cyanoacrylate monomer containing methane sulfonic acid (10 ppm), sulfur dioxide (2 ppm) and hydroquinone (3000 ppm) was used in preparing thermogravimetry analysis samples.

Fixture speeds were measured on formulations containing a polymethyl methacrylate (6 wt %), hydrophobic silica (6 wt %), calixarene (0.5 wt %) and silacrown (0.5 wt %) in ethyl cyanoacrylate monomer.

Results are summarized in Table I.

TABLE I

| Additive | % | Onset of decomposition temp (°C.) | % Wt loss at 150° C. in 900 min | 82° C. Stability (days) | Fixture speed (sec) Balsa wood | Cow leather |
|---|---|---|---|---|---|---|
| | | | Invention Formulations | | | |
| NNOD* | 2 | 210 | 5 | 20 | 25 | 40 |
| DNNOD* | 2 | 210 | 5 | 20 | 25 | 40 |
| | | | Comparative Formulation | | | |
| None (control) | — | 155 | 98 | 20 | 25 | 37 |

*NNOD is nitronaphthosultone S,S-dioxide).
**DNNOD is dinitronaphthosultone S,S-dioxide).

From Table 1 it can be seen that the onset of thermal decomposition and outgasing properties of the polymers were improved when a nitronaphthosultone additive was employed, compared to an additive free formulation.

EXAMPLE 2

Loctite ® SuperBonder 498, a commercial ethyl cyanoacrylate based adhesive formulation containing a conventional shelf-life stabilization system, was used as a control formulation to compare the effect of adding a nitronaphthosultone additive versus naphthosultone. Steel lap shear coupons were bonded with the control adhesive or the control adhesive to which an amount of additive had been added, as shown in Table 2. Each bonded assembly was aged at 121 ° C. for the periods indicated in Table 2. Tensile shear strengths were determined on bonded samples which had been allowed to return to room temperature before testing and other samples which were tested at 121° C. after the heat aging. The results, provided in Table 2, demonstrate the superiority of the nitronaphthosultone additive over both the control and the naphthosultone additive, even when the naphthosultone was added at substantially higher levels.

TABLE 2

| Formulation | % | TENSILE SHEAR STRENGTH (PSI) HEAT AGED AT 121 ° C. TESTED AT ROOM TEMP | | | | TENSILE SHEAR STRENGTH (PSI) Heat Aged At 121° C. Tested At 121° C. | | | |
|---|---|---|---|---|---|---|---|---|---|
| | | 2 WKS | 4 WKS | 6 WKS | 8 WKS | 2 WKS | 4 WKS | 6 WKS | 8 WKS |
| | | | | Comparative Formulations | | | | | |
| None | — | 2419 | 1215 | 579 | 508 | 1938 | 1102 | 361 | 232 |
| NPS*** | 5 | 2093 | 1330 | 1264 | 1003 | 1223 | 973 | 799 | 771 |

TABLE 2-continued

| Formulation | % | TENSILE SHEAR STRENGTH (PSI) HEAT AGED AT 121° C. TESTED AT ROOM TEMP | | | | TENSILE SHEAR STRENGTH (PSI) Heat Aged At 121° C. Tested At 121° C. | | | |
|---|---|---|---|---|---|---|---|---|---|
| | | 2 WKS | 4 WKS | 6 WKS | 8 WKS | 2 WKS | 4 WKS | 6 WKS | 8 WKS |
| NPS | 2.5 | 1977 | 1337 | 934 | 699 | 1748 | 1323 | 618 | 250 |
| Invention Formulations | | | | | | | | | |
| NNOD | 2 | 2575 | 2012 | 1871 | 1783 | 1758 | 1690 | 1542 | 1773 |
| NNOD | 1 | 2879 | 2139 | 1979 | 1765 | 2125 | 1921 | 1684 | 1842 |

***NPS is naphthosultone

EXAMPLE 3

The test procedures of Example 2 were utilized with a control rubber modified cyanoacrylate adhesive formulation sold under the trademark Black Max ® by Loctite Corporation. Quantities of additives and tensile shear strengths obtained at room temperature and at 121° C. as shown in Table 3.

TABLE 3

| Formulation | % | TENSILE SHEAR STRENGTH (PSI) HEAT AGED AT 121° C. TESTED AT ROOM TEMP | | TENSILE SHEAR STRENGTH (PSI) HEAT AGED AT 121° C. Tested At 121° C. | |
|---|---|---|---|---|---|
| | | 2 WKS | 4 WKS | 2 WKS | 4 WKS |
| Comparitive Formulations | | | | | |
| None | — | 1802 | 1600 | 1242 | 1152 |
| NPS | .25 | 1630 | 1924 | 1299 | 1221 |
| NPS | .5 | 1805 | 1790 | 1285 | 1357 |
| NPS | 1 | 2451 | 1280 | 1392 | 1309 |
| NPS | 2 | 2373 | 1445 | 1454 | 1489 |
| Invention Formulations | | | | | |
| NNOD | .25 | 2982 | 2577 | 1041 | 1122 |
| NNOD | .5 | 3425 | 3122 | 1174 | 1126 |
| NNOD | 1 | 3814 | 2817 | 1210 | 1210 |

What is claimed is:

1. A cyanoacrylate monomer adhesive formulation, curable to a polymer, comprising a cyanoacrylate monomer and an effective amount, for enhancing the thermal resistance of the cured polymer, of a naphthosultone compound substituted with at least one strong electron withdrawing group at least as strongly electron withdrawing as nitro.

2. A formulation as in claim 1 wherein said naphthosultone is substituted with one or more nitro groups.

3. A formulation as in claim 2 wherein said nitro substituted naphthosultone 6-nitronaphth-[1,8,-cd]-1,2-oxathiole S,S-dioxide or 6,8-dinitronapth-[1,8,cd]-1,2-oxathiole] 6,8-dinitronaphth-[1,8,cd]-1,2-oxathiole S,S-dioxide.

4. A formulation as in claim 2 wherein said nitro substituted naphthosultone compound is present in the formulation in an amount of 1%-2 % by weight.

5. A formulation as in claim 1 wherein said substituted naphthosultone compound is present in the formulation in an amount of 0.1-10% by weight.

6. A formulation as in claim 5 wherein said amount is at least 0.25%.

7. In a stabilized cyanoacrylate monomer adhesive formulation, curable to a polymer, the improvement wherein the formulation includes an amount, between 0.1 and 10%, of a naphthosultone compound substituted with one or more nitro groups, the amount being ineffective to affect the shelf life of the adhesive but effective to increase the thermal resistance of the cured polymer.

8. A formulation as in claim 7 wherein said amount is between 0.25% and 2%.

9. A cyanoacrylate polymer composition comprising a cyanoacrylate polymer and between 0.1 and 10% by weight of a naphthosultone compound having at least one strong electron withdrawing group at least as strongly electron withdrawing as nitro thereon.

10. A polymer composition as in claim 9 wherein said naphthosultone compound has at least one nitro group substituent.

11. A polymer composition as in claim 10 wherein said nitro substituted naphthosultone is 6-nitronaphth-[1,8,-cd]-1,2-oxathiole S,S-dioxide or 6,8-dinitronaphth-[1,8,cd]-1,2-oxathiole S,S-dioxide.

12. A polymer composition as in claim 10 wherein said nitro substituted naphthosultone compound is present in the polymer composition in an amount of 1-2% by weight.

13. A cyanoacrylate polymer composition as in claim 9 characterized by an onset of decomposition temperature of at least 200° C. when heated at 10° C. per minute.

14. A polymer composition as in claim 13 wherein said naphthosultone compound is a nitro substituted naphthosultone and is present in the polymer composition in an amount of 1-2% by weight.

15. A polymer composition as in claim 9 characterized by a weight loss of 10% or less when heated at 150° C. for 900 minutes.

16. A polymer composition, as in claim 15 wherein said weight loss is 5% or less.

17. A polymer composition as in claim 16 wherein said substituted naphthosultone compound is 6-nitronaphth-[1,8,-cd]-1,2-oxathiole S,S-dioxide or 6,8-dinitronaphth-[1,8,cd]-1,2-oxathiole S,S-dioxide.

18. A polymer composition as in claim 9 wherein the level of said substituted naphthosultone compound is at least 0.25%.

19. A cyanoacrylate monomer adhesive formulation, curable to a polymer, comprising a cyanoacrylate monomer and an effective amount, for enhancing the thermal resistance of the cured polymer, of a naphthosultone compound substituted with at least one strong electron withdrawing group selected from the group consisting of cyano, nitro and sulfonyl.

20. A cyanoacrylate polymer composition comprising a cyanoacrylate polymer and 0.1-10% by weight of a napthosultone compound substituted with at least one strong electron withdrawing group selected from the group consisting of cyano, nitro and sulfonyl.

* * * * *

UNITED STATES PATENT AND TRADEMARK OFFICE
CERTIFICATE OF CORRECTION

PATENT NO. : 5,424,343
DATED : June 13, 1995
INVENTOR(S) : Shabbir Attarwala

It is certified that error appears in the above-indentified patent and that said Letters Patent is hereby corrected as shown below:

Title page, item [54], and col. 1, line 2, delete "NAPTHASULTONE" and insert -- NAPTHOSULTONE--

Column 4, line 38, delete "diniteonaphthosultone" and insert --dinitronaphthosultone--

Signed and Sealed this

Twenty-sixth Day of September, 1995

Attest:

BRUCE LEHMAN

Attesting Officer                Commissioner of Patents and Trademarks

UNITED STATES PATENT AND TRADEMARK OFFICE
CERTIFICATE OF CORRECTION

PATENT NO. : 5,424,343

DATED : June 13, 1995

INVENTOR(S) : SHABBIR ATTARWALA

It is certified that error appears in the above-identified patent and that said Letters Patent is hereby corrected as shown below:

Table 3,
Col. 7, under "Comparitive Formulations" in last three columns delete:

| | | |
|---|---|---|
| !600 | !242 | !152 |
| !924 | !299 | !221 |
| !790 | !285 | !357 |
| 1280 | !392 | !309 |
| 1445 | !454 | !489 | and insert

| | | |
|---|---|---|
| 600 | 242 | 152 |
| 924 | 299 | 221 |
| 790 | 285 | 357 |
| 1280 | 392 | 309 |
| 1445 | 454 | 489 |

Col. 7, line 49, insert "is" before "6-nitronaphth"

Col. 7, line 50, delete " 6,8-dinitronapth-{1,8,cd}-1,2"

UNITED STATES PATENT AND TRADEMARK OFFICE
CERTIFICATE OF CORRECTION

PATENT NO. : 5,424,343
DATED : June 13, 1995
INVENTOR(S) : Shabbir Attarwala

It is certified that error appears in the above-identified patent and that said Letters Patent is hereby corrected as shown below:

Col. 8, line 44, delete "," after "composition".

Signed and Sealed this

Tenth Day of February, 1998

Attest:

BRUCE LEHMAN

*Attesting Officer*     Commissioner of Patents and Trademarks